United States Patent
Lee et al.

(10) Patent No.: US 6,977,280 B2
(45) Date of Patent: Dec. 20, 2005

(54) POLYVINYL CHLORIDE OR POLYOLEFIN MELT PROCESSABLE COMPOSITIONS CONTAINING POLYTETRAFLUOROETHYLENE MICROPOWDER

(75) Inventors: Biing-Lin Lee, Cranston, RI (US); Raman Patel, Cumberland, RI (US); Maryellen Cox, Cranston, RI (US); John C. Andries, East Greenwich, RI (US)

(73) Assignee: Teknor Apex Company, Pawtucket, RI (US)

( * ) Notice: Subject to any disclaimer, the term of this patent is extended or adjusted under 35 U.S.C. 154(b) by 74 days.

(21) Appl. No.: 10/459,329

(22) Filed: Jun. 11, 2003

(65) Prior Publication Data

US 2004/0254299 A1 Dec. 16, 2004

(51) Int. Cl.[7] .......... C08L 27/00; C08L 27/06; C08L 27/08; C08L 27/12
(52) U.S. Cl. ......... 525/199; 525/239; 524/519; 524/520; 524/527
(58) Field of Search .............. 525/199, 239; 524/519, 520, 527

(56) References Cited

U.S. PATENT DOCUMENTS

| | | | |
|---|---|---|---|
| 4,481,333 A | * 11/1984 | Fleischer et al. | ........... 525/192 |
| 4,904,735 A | 2/1990 | Chapman, Jr. et al. | |
| 4,973,626 A | 11/1990 | Wilkus et al. | |
| 5,013,792 A | 5/1991 | Chapman, Jr. et al. | |
| 5,046,815 A | * 9/1991 | Cain et al. | ................. 385/101 |
| 5,132,368 A | 7/1992 | Chapman, Jr. et al. | |
| 5,686,176 A | 11/1997 | Adam et al. | |
| 6,451,914 B1 | 9/2002 | Kloos et al. | |
| 2001/0048179 A1 | 12/2001 | Stewart et al. | |

FOREIGN PATENT DOCUMENTS

| | | | |
|---|---|---|---|
| EP | 0 554 174 A1 | * | 1/1993 |
| EP | 1 035 166 | | 9/2000 |
| FR | 2 265 818 | * | 10/1975 |
| WO | WO 01/06187 A2 | * | 1/2001 |

* cited by examiner

Primary Examiner—Nathan M. Nutter
(74) Attorney, Agent, or Firm—Hudak, Shunk & Farine Co. LPA

(57) ABSTRACT

The use of polytetrafluoroethylene micropowders having a particle size of generally less than about 20 microns as an additive for polyvinyl chloride or polyolefin unexpectedly produces compositions which are melt processable. Other unexpected properties include that the micropowder is deformable under shear and acts as a flame retardant.

4 Claims, No Drawings

POLYVINYL CHLORIDE OR POLYOLEFIN MELT PROCESSABLE COMPOSITIONS CONTAINING POLYTETRAFLUOROETHYLENE MICROPOWDER

FIELD OF THE INVENTION

The present invention relates to relatively low temperature melt processed compounded compositions of polytetrafluoroethylene (PTFE) micropowder with either a polyolefin or a polyvinyl chloride (PVC) and copolymers thereof. More specifically, the present invention relates to such compositions which have various desirable properties such as good flame retardantcy and/or smoke suppression, low heat release, an improved oxygen index, a reduced coefficient of friction, an improved wear, abrasion, and chemical resistance, and to articles made therefrom such as medical products, food contact articles, wire or cable insulation and/or jackets, and the like.

BACKGROUND OF THE INVENTION

Three major forms of PTFE exist: granular, fine powder and micropowder. Granular is produced by suspension polymerization in the absence of surfactant and generally is a spongy, porous irregular particle having a high molecular weight of about 10 million as obtained by rheological creep measurement. Fine powder is coagulated from a dispersion which is polymerized in the presence of an emulsifying agent and has a molecular weight of from about 1 million to about 5 million. Micropowder can be produced as a low molecular weight form of fine powder, or by scission of fine powder products as by gamma or electron beam irradiation. It has a molecular weight of from about 20,000 to about 800,000.

Conventional granular PTFE has an average or mean particle size of from about 20 to about 900 microns and is not melt processable due to its extremely high melt viscosity of at least $10^8$ Pa.s at 380° C. Consequently, PTFE cannot be fabricated by typical melt fabrication processes of extruding and injection molding. Other processes must be utilized such as compression molding and sintering which severely limit the types of articles which can be made.

Fine powder PTFE particles have a mean particle size of from about 20 to about 500 microns and an extremely high melt viscosity of $10^8$ pa.s (pascal seconds) at 380° C. and such particles are generally only processable when blended and subjected to shear with a lubricating oil as by extrusion. However, such an extrusion process, known as paste extrusion, requires removal of the lubricant after extrusion.

Prior art patents such as U.S. Pat. Nos. 4,904,735; 5,013,792; and 5,132,368 to Chapman, Jr., et al, of E. I. Du Pont de Nemours and Company of Wilmington, Del., relate to polymer blend compositions containing a major portion of a difficult melt-processable polymer and a minor portion of a fluorocarbon copolymer, or to a fluoropolymer process and wherein the fluoropolymer has a fluorine to carbon ratio of at least 1:2.

SUMMARY OF THE INVENTION

Compositions of PTFE micropowder blended with either plasticized PVC or polyolefin are unexpectedly melt processable at relatively low temperatures and unexpectantly deform under shear as by elongation and thus can be mixed by utilizing conventional equipment such as a high shear mixer, a Banbury, a calender, and the like and articles can be made by extrusion, injection molding, compression molding, and the like. Such compositions have unexpected properties such as improved flame retardancy and/or low smoke generation, good oxygen index, low peak heat and total heat release, a low coefficient of friction, improved wear, abrasion, and chemical resistance, good processability in the molten state, and a reduction of dielectric properties. The PTFE micropowder containing compositions are generally free of a compatiblizing agent and can be utilized to make various end products such as food contact articles, medical products, thermoplastic articles having improved wear resistance and a low coefficient of friction, and insulation and/or jackets for wire or cable. The melt processing temperature of the PTFE blends is at a temperature significantly below the melting temperature of the PTFE micro powder.

Other aspects and advantages of the invention will be apparent from the following description of the preferred embodiments and the claims.

DETAILED DESCRIPTION OF THE PREFERRED EMBODIMENTS

Polyvinyl chloride or PVC as used herein includes a homopolymer of vinyl chloride or a copolymer of vinyl chloride and one or more olefin monomers having from 2 to about 5 carbon atoms such as ethylene and/or propylene. Whenever copolymers are utilized, the amount of vinyl chloride repeat units therein is generally a majority and usually at least about 50% and preferably at least about 60%, about 70%, about 80%, or about 90% of the total number of repeat units in the copolymer.

PVC or copolymers of the present invention are preferably plasticized and contain from about 25 to about 100 and desirably from about 30 to about 60 parts by weight of a plasticizer per 100 parts by weight of the PVC polymer or copolymer. The plasticizers generally include compounds known to the literature and to the art and include an internal plasticizer such as a monomer that is copolymerized with vinyl chloride monomer, or desirably an external plasticizer which is incorporated into PVC. Suitable plasticizers include monomeric plasticizers such as general purpose plasticizers, strong solvating plasticizers, low volatility plasticizers, low temperature plasticizers, polymeric plasticizers and flame retardant plasticizers.

Examples of general purpose plasticizers include diisoheptyl phthalate, diisooctyl phthalate, di-2-ethylhelxyl phthalate, dicapryl phthalate, and di-2-ehtylhexyl terephthalate. Examples of strong solvating plasticizers include various phthalates such as diisobutyl phthalate, di-n-butyl phthalate, butyl benzyl phthalate, dihexyl phthalate, and butyl octyl phthalate. Examples of benzoate solvating plasticizers include propylene glycol dibenzoate and dipropylene glycol dibenzoate. Low-volatility plasticizers include various phthalates such as diisodecyl phthalate, diundecyl phthalate, diisoundecyl phthalate, undecyl dodecyl phthalate, and ditridecyl phthalate; various trimellitates such as tri-2-ethylhexyl trimellitate, triisooctyl trimellitate, and triisononyl trimellitates; and various pentaerythritols such as mixed tetraester pentaerythritol. Low-temperature plasticizers include various linear phthalates having anywhere from 7 to about 11 carbon atoms, various adipates such as diisooctyl adipate, di-2-ethylhexyl adipate, diisononyl adipate, and diisodecyl adipate, various azelates such as di-2-ethylhexyl azelate, various glutarates such as diisodecyl glutarate, and various sebacates such as di-2-ethylhexyl sebacate.

Polymeric plasticizers are generally the condensation products of a polyhydric alcohol such as ethylene glycol and a dibasic organic acid. Examples of suitable dibasic acids include adipic acid, sebacic acid, phthalic acid, and trimellitic acid.

The flame-retardant plasticizers are generally various phosphates such as tricresyl phosphate, trixylenyl phosphate and triphenyl phosphate. Examples of other suitable flame-retardant plasticizers include 2-ethylhexyl diphenyl phosphate, isodecyl diphenyl phosphate, tri-2-ethylhexyl phosphate, and tricresyl phosphate.

The above list of plasticizers is not all inclusive and it is to be understood that various other known plasticizers can also be utilized.

The compounded PVC compositions of the present invention contain conventional additives known to the art and to the literature and include colorants, pigments, lubricants, stabilizers, antioxidants, fillers, flame retardants, smoke suppressants, and the like. Examples of colorants include organic and inorganic colorants known to the literature and to the art and pigments such as titanium dioxide, carbon black, and the like. Examples of lubricants include stearic acid, metal salts of stearic acid such as zinc stearate, barium stearate, or calcium stearate, and polyethylene glycols. Examples of suitable stabilizers include lead stabilizers, barium or zinc heat stabilizers, organic heat stabilizers as well as epoxidized soybean oil. Examples of antioxidants include phenolic and thioester antioxidants and a preferred antioxidant is tetrakis(methylene(3,5-di-t-butyl-4-hydroxylhydrocinnamate)) methane, available from Ciba Geigy under the trade name IRGANOX 1010. Examples of suitable fillers include Kaolin clay, mica, calcium carbonate, and the like, as well as other fillers commonly used in PVC compositions. The above additives can be utilized in combination with each other and one or more types of a specific additive, for example two different lubricants, can be utilized.

Considering the polyolefins, they are generally derived from one or more monomers having from 2 to about 5 carbon atoms with polyethylene being desired and various types or grades of polyethylene being preferred. A suitable copolymer is derived from ethylene and propylene. Suitable polyethylenes include very low density polyethylene (VLDPE), linear low density polyethylene (LLDPE), low density polyethylene (LDPE), medium density polyethylene (MDPE), high density polyethylene (HDPE), or combinations thereof. Especially preferred polyethylenes include VLDPE, LLDPE, and HDPE.

The one or more polyolefins can contain various additives known to the literature and to the art such as various colorants, pigments, lubricants, stabilizers, antioxidants, fillers, flame retardants, smoke suppressants, and the like. For purposes of brevity, such additives generally include those set forth hereinabove with respect to polyvinyl chloride. Thus the same are hereby fully incorporated by reference. Naturally, combinations of such additives such as a lubricant and a stabilizer can be utilized, as well as one or more compounds within the type of additive, for example two different flame retardants.

The PTFE micropowders of the present invention are known in the art and at least described in The Encyclopedia of Chemical Technology, 4$^{th}$ Ed., pub. by John Wiley & Sons (1994) on pp. 637–639 of Vol. 11, and in an article by H. J Hendriock, "PTFE Micropowders", Kunstoffe German Plastics, 76, pp. 920–926 (1986). The micropowders are not a PTFE granular resin, nor are they a PTFE fine powder. The PTFE micropowders of the present invention are generally white, free-flowing micropowders and have a molecular weight below that of PTFE granular resins or fine powders, eg. less than a molecular weight of about 900,000 and desirably less than about 800,000. Preferred PTFE micropowders of the present invention are obtained by irradiate degradation of granular powder polytetrafluoroethylene. The peak melt temperatures of PTFE micropowders of the present invention are generally from about 315° C. to about 350° C., desirably from about 320° C. to about 340° C., and preferably from about 320° C. to about 330° C., as compared to granular PTFE which is almost completely insoluble and has exceedingly high viscosity such that it is non-processable. The melt onset temperature of the PTFE micropowders is generally from about 300° C. to about 340° C. and desirably from about 305° C. to about 325° C. The peak melt and melt onset temperatures are generally determined by a differential scanning calorimeter using 10° C. per minute. The melt flow rate (g/10 min) (Test method DIN 53735) is from <2 to 12. The micropowder generally has an average particle size of from about 0.5 to about 20, desirably from about 1 about 6 or about 8, and preferably from about 1 to about 3 microns. Suitable commercially available PTFE micropowders which can be utilized include PA5952 and PA5956 made by Dyneon, Zonyl MP1000, MP1150 and MP1200 made by Dupont, and Polymist F5A made by Ausimont.

An important aspect of PTFE micropowder as noted is that it improves the flow of the blends or compositions of the present invention under pressure even at temperatures well below its melting point. It is thus highly suitable for injection molding and more particularly for extruding. When subjected to shear, it has been unexpectedly found that the PTFE micropowder can deform, as by elongating, and thus can easily pass through the screen pack of an extruder having an opening much smaller than the powder particle size. For example, a micropowder which has an average particle size of 6 microns has been found to easily pass through a 3 micron size screen. In contrast, fine powder and granular PTFE do not easily pass through a screen that is smaller than its particle size.

With respect to the compounded PVC compositions, the amount of the PTFE micropowder is generally from about 15 to about 75, desirably from about 15 to about 50, and preferably from about 15 to about 25 or about 40 parts by weight per 100 parts by weight of the PVC. With respect to polyolefin compositions, the amount of the PTFE micropowder is generally from about 10 to about 100, desirably from about 10 to about 75, and preferably from about 10 or about 25 to about 50 parts by weight per 100 parts by weight of the polyolefin.

Compounding of either the PVC composition blend or the polyolefin composition generally involves mixing or blending the various components together, such as the PVC polymer or copolymer, the PTFE micropowder, the plasticizer, and the one or more additives including various optional but generally utilized flame retardants and/or smoke suppressants as set forth hereinbelow such as an antimony compound, a metal hydroxide, a hydroxycarbonate or a carbonate, a molybdenum, a zinc compound, and the like. Powder mixing can be done using a Henschel mixer. The premixed components are then compounded by melt processing as by heating and/or applying high shear as by using an internal mixer, a two roll mill, or a twin screw extruder, equipped with high shear screws, and desirably formed into particles such as pellets, chips, granules, and the like.

Subsequently, the thermoplastic particles, etc., can be formed into the desired part or article by melt processing in an extruder, or by injection or compression molding. The melt processing temperature of the PVC composition as previously noted is generally from about 160° C. to about 200° C. and preferably from about 160° C. to about 180° C. The composition of the polyolefin and the PTFE micropowder generally has a melt processing temperature of from about 150° C. to about 260° C. and preferably from about 160° C. to about 220° C. Compositions of both PVC and PTFE micropowder, and polyolefin and PTFE micropowder, have been found to yield unexpected properties such as flame retardancy without an increase of the dielectric constant of the composition, a highly improved dissipation factor, a large reduction in various heat release properties as well as a large reduction in average specific extinction area, and a reduced coefficient of friction. Still other properties include an increase of time to ignition, and reduced percent char.

Despite the fact that PTFE is not compatible with PVC or polyolefin, another important unexpected aspect of the present invention is that a compatiblizing agent is not needed to form the melt processable PTFE micropowder-polymer compositions of the present invention having good physical properties. For example, tensile strengths of at least 1,200 psi for polyolefin-PTFE and at least 2,500 psi for PVC-PTFE are obtained. That is the amount of any compatiblizing agent utilized is small, generally less than about 10 parts by weight, desirably less than about 5 parts by weight, and preferably less than about 2 parts by weight and even zero, that is no compatibilizing agent, per 100 parts by weight of the PVC or the polyolefin.

A desired area of use of the compounded polyolefin-PTFE melt processable composition and the compounded PVC-PTFE melt processable composition is as an electrical insulator or flame retardant for wire and cable jackets. To improve such properties thereof, various flame retardants, smoke suppressants and the like can also be utilized. Such compounds are known to the art and to the literature. Examples of flame retardants include antimony compounds and extended products thereof; metal hydroxides, hydroxycarbonates and carbonates; molybdenum, zinc and iron compounds; and combinations thereof.

The antimony compounds generally include antimony trioxide, as well as combination products thereof containing synergists and extenders. Other antimony compounds include antimony pentoxide and sodium antimonate.

The metal hydroxides include the alkaline as well as the alkaline earth hydroxides such as magnesium hydroxide. Another compound is aluminum trihydrate. Examples of hydrocarbonates and carbonates include magnesium hydroxycarbonate, magnesium-calcium carbonate and the like.

The molybdenum, zinc, and iron compounds include molybdenum oxide, ammonium molybdate and various transitional metal molybdates, zinc borate and zinc oxide including various complexes thereof as with water, iron oxides and various organometalic complexes of iron.

Smoke suppressants include hydrated and inert fillers as well as char formers. Examples of fillers include calcium carbonate ($CaCO_3$, ground and precipitated types), gypsum ($CaSO_4 \cdot 7H_2O$), Barytes ($BaSO_4$), alumina trihydrate (Al[OH]$_3$), magnesium hydroxide (Mg[OH]$_2$), magnesium carbonates ($MgCO_3$, $MgCO_3 \cdot Mg[OH]_2 \cdot 3H_2O$), calcium magnesium carbonates ($CaCO_3 \cdot MgCO_3$, $3CaCO_3 \cdot MgCO_3$), wollastonite ($CaSiO_3$) and talc [$Mg_3Si_4O_{10}(OH)_2$].

Examples of char formers include zinc compounds such as zinc borate, zinc-magnesium oxide complex (e.g., Ongard2), and zinc sulfide-zinc oxide-barium sulfate lithopone; iron compounds such as dicyclopentadienyliron (ferrocene) and iron oxide; and molybdenum compounds such as molybdenum oxide, molybdenum sulfide, ammonium molybdate, zinc molybdate, iron molybdate and calcium molybdate.

The above flame retardants and/or smoke suppressants can be utilized in suitable amounts to affect desired end properties and thus the amount thereof would depend upon the flame retardant and/or smoke suppressant properties of the base polymer such as PVC or the polyolefin as well as the desired end use of the product. Generally, the amount of the flame retardant and/or smoke suppressant utilized with a plasticized PVC polymer or copolymer is generally from about 20 to about 120 and desirably from about 30 to about 80 parts by weight per 100 parts by weight of the PVC polymer or copolymer. With respect to the various polyolefins, the amount of the flame retardants and/or smoke suppressants is generally from zero or about 1 to about 100 and desirably from about 10 to about 60 parts by weight per 100 parts by weight of the one or more polyolefins.

Compositions of the present invention can be utilized in numerous applications wherein good physical properties are desired along with good flame retardant and/or smoke suppressant properties, as in high temperature uses for extended periods of time. Areas of use include wherever PVC or polyolefin compounds are desired having good chemical, wear, or abrasion resistance, a low coefficient of friction, nonstick properties, good lubricity, or the like. Specific examples of applications include wire and cable insulation and/or jacketing, automotive parts, construction materials, food contact articles such as cap liners, medical devices such as orthopedic braces, prostheses, splints, and the like. When used as an insulator for wire and cable applications, it is desirable that the dielectric constant of the composition be generally about 2.4 or less and desirably about 2.1 or less.

The invention will be better understood by reference to the following examples which serve to illustrate but not to limit the present invention.

PTFE-plasticized PVC or PTFE-polyolefin compositions according to this invention have the general ingredients given in the following examples. The compositions are prepared according to conventional compounding methods by combining all of the ingredients in a high speed mixer and then melt processing as by heating and/or applying shear as in a Banbury mixer, extruder, or twin screw extruder. The melt processing temperature for PTFE-Polyolefin compounds is about 160° C. to about 200° C. The melt processing temperature for PTFE-plasticized PVC compounds is about 160° C. to about 180° C. In the following tables, the amounts listed are parts by weight.

Various properties were obtained utilizing specific tests as follows.

| | |
|---|---|
| Tensile strength (lbs/in$^2$) | (ASTM D-412) |
| Elongation % | (ASTM D-412) |
| Brittle point (model E, ° C.) | (ASTM D-746) |
| Oxygen Index | (ASTM D-2863) |
| Dielectric constant | Model 7600 Precisoin RLC meter, Quad Tech, Inc, 1996 |
| Dissipation factor | Model 7600 Precisoin RLC meter, Quad Tech, Inc, 1996 |

-continued

| | |
|---|---|
| Cone calorimeter, peak heat release rate, KW/sq meter | ASTM E-1354; or ISO 5660 |
| Average heat release, KW/sq meter | ASTM E-1354; |
| Average heat of combustion, KJ/g | ASTM E-1354; |
| Average SEA, sq meter/Kg | ASTM E-1354; |
| Peak of extinction coeff, 1/meter | ASTM E-1354; |
| % char | ASTM E-1354; |
| Arapahoe Smoke, decharred | (ASTM D-4100) |
| Arapahoe Smoke not decharred | (ASTM D-4100) |

EXAMPLES

PVC COMPOSITIONS

In Example 1, a composition of plasticized PVC was utilized with varying amounts of PTFE micropowder.

Example 1

TABLE 1A

Compositions of Plasticized PVC)/PTFE
The PTFE micropowder was Dyneon PA5952 having a mean particle size of about 6 microns and a peak melting temperature of 329° C.

| | Example A (Control) | Example B | Example C | Example D | Example E | Example F | Example G |
|---|---|---|---|---|---|---|---|
| PVC, IV = 1.03 | 100 | 100 | 100 | 100 | 100 | 100 | 100 |
| plasticizer | 30 | 30 | 30 | 30 | 30 | 30 | 30 |
| Lead stabilizer | 6 | 6 | 6 | 6 | 6 | 6 | 6 |
| Stearic Acid | 0.25 | 0.25 | 0.25 | 0.25 | 0.25 | 0.25 | 0.25 |
| Barium Stearate | 0.5 | 0.5 | 0.5 | 0.5 | 0.5 | 0.5 | 0.5 |
| Processing aid | 0.6 | 0.6 | 0.6 | 0.6 | 0.6 | 0.6 | 0.6 |
| FR - plasticizer 1 | 0 | 0 | 0 | 0 | 10 | 10 | 10 |
| FR - plasticizer 2 | 5 | 5 | 5 | 5 | 5 | 5 | 5 |
| PTFE micropowder (6 Micron) | 0 | 25 | 50 | 75 | 0 | 25 | 50 |

TABLE 1B

Properties of Plasticized PVC/PTFE

| | Example A | Example B | Example C | Example D | Example E | Example F | Example G |
|---|---|---|---|---|---|---|---|
| Tensile strength, psi 2"/min | 5200 | 4350 | 3450 | 2900 | 4700 | 3850 | 3100 |
| % elongation | 250 | 230 | 190 | 170 | 270 | 240 | 220 |
| Brittle point, ° C. | −21.5 | −9.5 | −2 | −0.5 | −23 | −15 | −8 |
| Oxygen index | 27 | 26.5 | 27.5 | 28 | 27 | 28.5 | 28 |
| Dielectric constant @ 1 mega Hz | 2.93 | 2.82 | 2.74 | 2.68 | 2.95 | 2.86 | 2.81 |
| Dissipation factor @ 1 Mega Hz | 0.020 | 0.031 | 0.030 | 0.029 | 0.046 | 0.041 | 0.042 |
| Peak Heat Release Rate, kw/m$^2$ | 413 | 251 | 235 | 218 | 503 | 211 | 93 |
| Average Heat Release, kw/m$^2$ | 236 | 170 | 140 | 125 | 218 | 99 | — |
| Total Heat Release, kJ/m$^2$ | 75613 | 64047 | 60750 | 55456 | 83480 | 40160 | — |
| Average Heat of Combustion, KJ/g | 9.426 | 7.315 | 6.472 | 6 | 13.99 | 3.61 | — |
| Average SEA, m$^2$/Kg | 984 | 870 | 768 | 676 | 916 | 828 | 659 |
| Peak of Extinction coeff | 14 | 10 | 9 | 8 | 17 | 11 | 10 |
| % Char | 11.2 | 14 | 16 | 21 | 15 | 12 | 10 |

As apparent from Tables 1A and 1B, as the amount of PTFE micropowder was increased, various properties were improved such as the peak of extinction coefficient, percent char and the like, while the amount of heat released, and the peak heat release rate etc. were decreased.

Example 2

Example 2 relates to composition of plasticized PVC, PTFE micropowder, organic flame retardants, as well as generally inorganic flame retardants such as antimony trioxide, hydrated aluminum, and zinc borate.

TABLE 2A

Compositions of PTFE/Plasticized PVC with the flame retardants and smoke suppressants

|  | Example A | Example B (control) |
|---|---|---|
| PVC, IV = 1.03 | 100 | 100 |
| plasticizer | 30 | 30 |
| calcined kaolin | 5 | 5 |
| lead stabilizer | 6 | 6 |
| Stearic Acid | 0.25 | 0.25 |
| Barium Stearate | 0.5 | 0.5 |
| processing aid | 0.6 | 0.6 |
| FR - plasticizer 1 | 15 | 15 |
| FR - plasticizer 2 | 5 | 5 |
| PTFE-PA 5952 (Dyneon) | 25 | 0 |
| antimony trioxide | 5 | 5 |
| Hydrated alumina | 40 | 40 |
| smoke suppresant | 5 | 5 |
| Zinc borate | 2 | 2 |
| Total | 239.35 | 214.35 |

TABLE 2B

Properties of PTFE/Plasticized PVC with the flame retardants and smoke suppressants

|  | Example A | Example B (Control) |
|---|---|---|
| Tensile Strength, 2"/min | 2500 | 3000 |
| % elongation | 220 | 250 |
| Dielectric constant @ 1 mega Hz | 3.15 | 3.35 |
| Dissipation factor @ 1 Mega Hz | 0.0444 | 0.0285 |
| Oxygen Index | 41 | 39 |
| Peak Heat Release Rate, kw/m$^2$ | 109 | 114 |
| Total heat released, MJ/m2 | 48.62 | 59.69 |
| Avg effective Heat of combustion, MJ/Kg | 8 | 9.72 |
| Avg specific ext area, m$^2$/kg | 242 | 552.15 |
| Time to sustained ignition, sec | 38 | 12.36 |
| Peak smoke (1/m) | 3 | 3.65 |
| % Char | 27.7 | 35.7 |

Once again, as apparent from the tables, utilization of PTFE micropowder resulted in generally dramatic improved flame and/or smoke suppressant properties as well as reduced heat release.

POLYOLEFIN EXAMPLES

Example 3

PTFE Micropowder and LLDPE

In this Example, a set of compositions of LLDPE with different amount of PTFE micropowder was melt blended at 180° C. Table 3A sets forth the ingredients of the compositions whereas Table 3B sets forth the blend properties.

TABLE 3A

Compositions of PTFE/LLDPE

|  | Example A (Control) | Example B | Example C | Example D |
|---|---|---|---|---|
| LLDPE | 100 | 100 | 100 | 100 |
| PTFE micropowder* | 0 | 10 | 25 | 50 |

*Dyneon PA5956 having a mean particle size of about 2 microns and a peak melting temperature of 323° C.

TABLE 3B

Properties of PTFE/LLDPE

|  | Example A (Control) | Example B | Example C | Example D |
|---|---|---|---|---|
| Cone @50 kw/m$^2$ |  |  |  |  |
| flame out | 272 | 288 | 296 | 335 |
| Peak heat release rate, kw/m2 | 2377 | 1800 | 1490 | 1082 |
| Avg heat release rate, KW/m2 | 1004 | 890 | 779 | 645 |
| Total heat released MJ/m2 | 212 | 202 | 185 | 167 |
| Avg heat of combustion, MJ/Kg | 44 | 38 | 32 | 26 |
| Arapahoe smoke, Decharred % | 12.28 | 2.34 | 1.27 | 1.26 |
| Arapahoe Smoke, not decharred, % | 14.9 | 3.65 | 3.26 | 3.33 |
| % char | 19.84 | 37.65 | 61.32 | 62.12 |
| tensile Properties |  |  |  |  |
| % elongation | 918 | 812 | 709 | 636 |
| tensile strength | 3059 | 3055 | 2174 | 1729 |
| DC |  |  |  |  |
| 1k DF | 2.12 | 2.12 | 2.12 | 2.11 |

TABLE 3B-continued

Properties of PTFE/LLDPE

|       | Example A (Control) | Example B | Example C | Example D |
|-------|---------------------|-----------|-----------|-----------|
| 1K DC | 0.00018             | 0.00022   | 0.00021   | 0.00021   |
| 1M DF | 2.13                | 2.15      | 2.15      | 2.10      |
| 1M    | 0.00142             | 0.00169   | 0.00169   | 0.00108   |

As apparent from the above data, the following aspects are noted:

1) Based on the Cone calorimeter burning test, the PTFE micropowder imparts the following desirable performance to LLDPE: (i) decreasing the peak heat release, (ii) decreasing the average heat of combustion, (iii) decreasing the average heat release, and (iv) decreasing the total heat release.

2) Based on the Arapahoe smoke test, PTFE micropowder further imparts the following smoke suppressant to LLDPE: (i) decreasing smoke, and (ii) increasing % of char.

3) The blends of PTFE/LLDPE according to this invention also have reasonable good tensile properties.

Surprisingly, the dielectric properties of the blends of PTFE/LLDPE are still quite similar to that of the LLDPE.

While in accordance with the Patent Statutes, the best mode and preferred embodiments have been set forth, the scope of the invention is not limited thereto, but rather by the scope of the attached claims.

What is claimed is:

1. A compounded polyvinyl chloride composition, comprising:
    a plasticized polyvinyl chloride homopolymer or copolymer;
    a PTFE micropowder having a particle size of from about 0.5 to about 20 microns; wherein the amount of said PTFE micropowder is from about 15 to about 75 parts by weight per 100 parts by weight of said polyvinyl chloride homopolymer or copolymer, and
    including from about 20 to about 120 parts by weight of a flame retardant, or a smoke suppressant, or a combination thereof per 100 parts by weight of said polyvinyl chloride homopolymer or copolymer;
    said composition being melt processable.

2. A compounded polyvinyl composition according to claim 1, wherein said polyvinyl chloride copolymer is derived from one or more olefin monomers having from about 2 to 5 carbon atoms, and wherein the amount of said plasticizer is from about 25 to about 100 parts by weight per 100 parts by weight of said polyvinyl chloride homopolymer or copolymer.

3. A compounded polyvinyl composition according to claim 2, wherein said PTFE micropowder has a particle size from about 1 to about 8 microns and a melt temperature of about 350° C. or less, wherein the amount of said PTFE micropowder is from about 15 to about 50 parts by weight per 100 parts by weight of said polyvinyl chloride homopolymer or copolymer, wherein the amount of any compatibilizing agent is generally less than about 10 parts by weight per 100 parts by weight of said polyvinyl chloride homopolymer or copolymer,
    wherein the amount of said flame retardant, or said smoke suppressant, or said combination thereof is from about 30 to about 80 parts by weight per 100 parts by weight of said polyvinyl chloride polymer or copolymer; and
    wherein said compounded polyvinyl chloride composition is melt processable at a temperature of from about 160° C. to about 200° C.

4. A compounded polyvinyl composition according to claim 3, wherein said polymer is said polyvinyl chloride homopolymer, wherein said PTFE micropowder has a melt temperature from about 320° C. to about 340° C. and a particle size of from about 1 to about 6 microns, wherein the amount of said PTFE micropowder is from about 15 to about 40 parts by weight per 100 parts by weight of said polyvinyl chloride,
    wherein said compounded polyvinyl chloride composition is melt processable at a temperature of from about 160° C. to about 180° C.

* * * * *

UNITED STATES PATENT AND TRADEMARK OFFICE
CERTIFICATE OF CORRECTION

PATENT NO. : 6,977,280 B2
DATED : December 20, 2005
INVENTOR(S) : Biing-Lin Lee et al.

It is certified that error appears in the above-identified patent and that said Letters Patent is hereby corrected as shown below:

Column 8,
Table 1A, "Compositions of Plasticized PVC)/PTFE" should read -- Compositions of Plasticized PVC/PTFE --.

Column 11,
Line 11, "A compounded polyvinyl composition" should read -- A compounded polyvinyl chloride composition --.

Column 12,
Line 21, "A compounded polyvinyl composition" should read -- A compounded polyvinyl chloride composition --.
Line 39, "A compounded polyvinyl composition" should read -- A compounded polyvinyl chloride composition --.

Signed and Sealed this

Fourteenth Day of March, 2006

JON W. DUDAS
*Director of the United States Patent and Trademark Office*